(12) United States Patent
Wang et al.

(10) Patent No.: US 12,172,927 B2
(45) Date of Patent: Dec. 24, 2024

(54) SUSTAINED RELEASE GROUTING MATERIAL WITH ITS PREPARATION METHOD AND APPLICATION

(71) Applicant: SHANDONG UNIVERSITY OF SCIENCE AND TECHNOLOGY, Qingdao (CN)

(72) Inventors: Lihua Wang, Qingdao (CN); Chunfeng Li, Qingdao (CN); Zhijie Wen, Qingdao (CN); Zengguang Pang, Qingdao (CN); Xiaoming Fan, Qingdao (CN); Qinghua Shu, Qingdao (CN); Shifu Sun, Qingdao (CN); Qingbiao Wang, Qingdao (CN); Chunquan Dai, Qingdao (CN); Weiwei Han, Qingdao (CN); Shunrong Wang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/502,117

(22) Filed: Nov. 6, 2023

(65) Prior Publication Data
US 2024/0150243 A1 May 9, 2024

(30) Foreign Application Priority Data
Nov. 9, 2022 (CN) .......................... 202211396291.1

(51) Int. Cl.
*C04B 28/00* (2006.01)
*C04B 24/16* (2006.01)
(Continued)

(52) U.S. Cl.
CPC .......... *C04B 28/001* (2013.01); *C04B 24/168* (2013.01); *C04B 40/0032* (2013.01);
(Continued)

(58) Field of Classification Search
CPC . C04B 14/104; C04B 18/022; C04B 20/1048; C04B 2103/0051;
(Continued)

(56) References Cited

FOREIGN PATENT DOCUMENTS

| CN | 102603220 A | 7/2012 |
|---|---|---|
| CN | 107235688 A | 10/2017 |

(Continued)

OTHER PUBLICATIONS

Liu Yong-chao, et al. Experimental study on plugging effect of different Chinese Journal of Geotechnical Engineering, vol. 43 249-252 Publication date:Nov. 15, 2021.
(Continued)

*Primary Examiner* — Shuangyi Abu Ali
(74) *Attorney, Agent, or Firm* — CBM PATENT CONSULTING, LLC

(57) ABSTRACT

It discloses a sustained release grouting material, a preparation method and an application thereof; the sustained release grouting material comprises a water swelling core and a water-soluble sustained release coating, the water swelling core is composed of bentonite, SAP and xanthan gum, which is granulated by disc granulator relying on the cohesiveness of xanthan gum; the water-soluble sustained-release coating is prepared by mixing water-soluble starch, polyvinyl alcohol, poloxamer, lubricant and plasticizer with deionized water to obtain a film-forming solution, and the film-forming solution is coated on a coating machine; the invention uses a coating machine to coat a layer of slow-release coating on the surface of the water-absorbing expansion core, and adjusts the coating thickness by controlling the mass ratio of the coating film-forming liquid to the water-absorbing expansion core particles, so as to realize the controllable water absorption onset time of the expansion core.

7 Claims, 1 Drawing Sheet

(51) Int. Cl.
*C04B 40/00* (2006.01)
*C04B 40/06* (2006.01)
*C04B 103/00* (2006.01)
*C04B 111/70* (2006.01)

(52) U.S. Cl.
CPC ........ *C04B 40/0616* (2013.01); *C04B 40/065* (2013.01); *C04B 2103/0051* (2013.01); *C04B 2111/70* (2013.01)

(58) Field of Classification Search
CPC ....... C04B 2103/30; C04B 2111/00293; C04B 2111/70; C04B 24/168; C04B 24/2623; C04B 24/38; C04B 28/001; C04B 40/0032; C04B 40/0616; C04B 40/065; Y02W 30/91
See application file for complete search history.

(56) References Cited

FOREIGN PATENT DOCUMENTS

| CN | 207794062 U | | 8/2018 |
| CN | 108706949 A | | 10/2018 |
| CN | 109250971 A | * | 1/2019 |
| CN | 112592127 A | | 4/2021 |
| JP | 2007186388 A | | 7/2007 |
| WO | 2022141717 A1 | | 7/2022 |

OTHER PUBLICATIONS

Lihua Wang, et al. Study on the Quick Hardening Cement-based Grouting Material's Modification by Nano-materials Applied Mechanics and Materials 718-723 Publication date: Aug. 8, 2013.

* cited by examiner

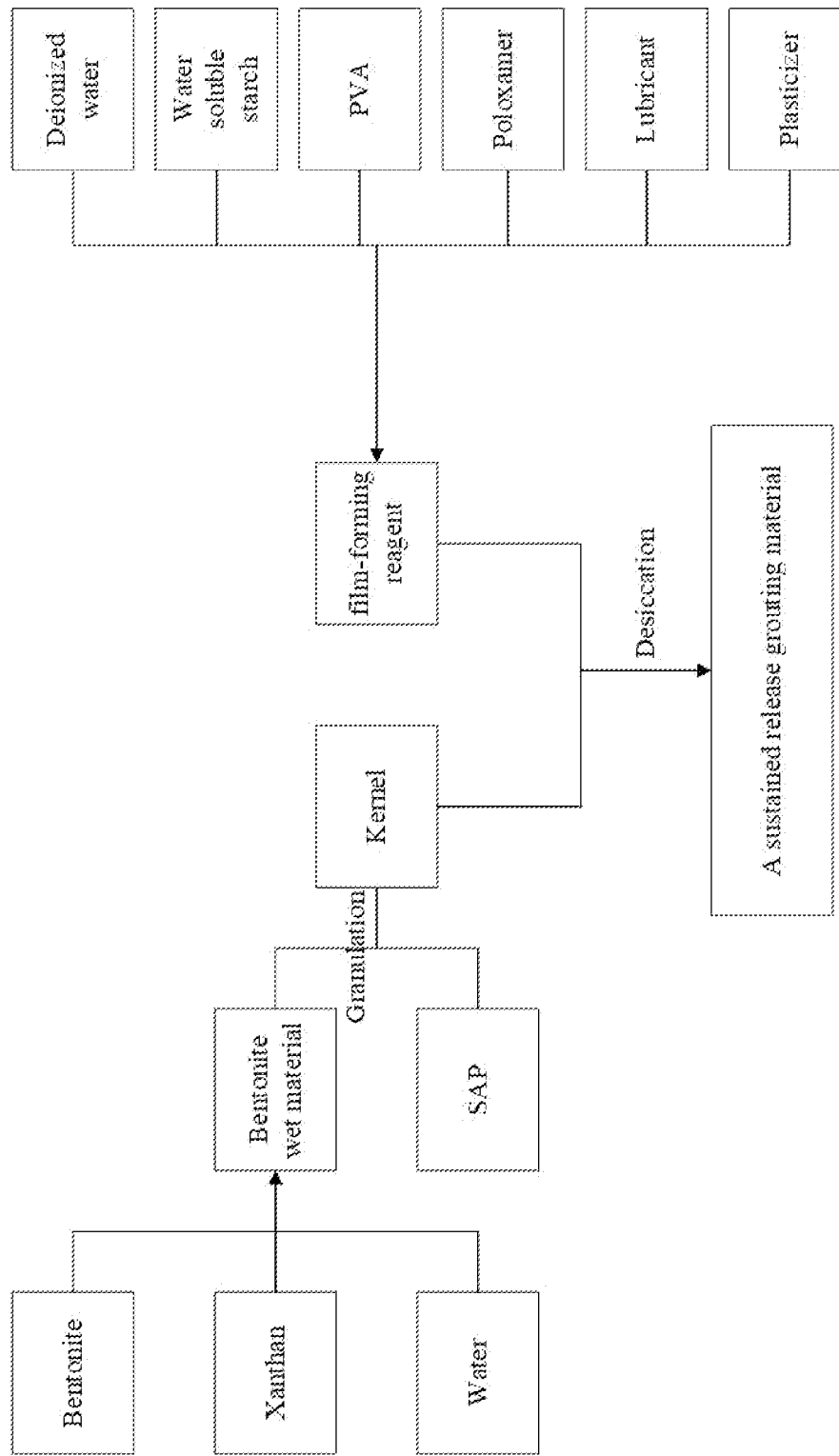

SUSTAINED RELEASE GROUTING MATERIAL WITH ITS PREPARATION METHOD AND APPLICATION

CROSS-REFERENCE TO RELATED APPLICATIONS

This application claims priority to Chinese Patent Application Ser. No. CN2022113962911 filed on 9 Nov. 2023.

FIELD OF INVENTION

The present invention relates to grouting materials for underground engineering, in particular to a sustained release grouting material and its preparation method.

BACKGROUND

At present, the scale of underground engineering construction in China is increasing, and the number of complex geological conditions is also gradually increasing. Water and mud inrush disasters encountered in underground engineering construction under complex geological conditions have become one of the main disasters affecting engineering construction. The large-scale and frequent water inrush disasters not only endanger the safety of engineering construction, but also seriously affect the progress of the project, causing huge losses to the project. Grouting technology is one of the most effective measures to address water inrush accidents in underground engineering.

The published Chinese patent (No. CN109535306A) discloses an expandable polymer grouting material and its preparation method for high-pressure and high-flow karst burst water treatment. This method mainly involves preparing acrylic super absorbent polymer first, then spraying crosslinking agent on its surface to control the water swelling time of the super absorbent polymer by adjusting the crosslinking index, and effectively control the volume expansion of the slurry. This method can effectively plugging high-flow water inrush, but its production process is relatively complex. And due to the fact that this technical scheme only uses super absorbent polymer as a water swelling material, the material will lose water after a period of time, leaving a large number of holes, which cannot cure the leakage problem.

The published Chinese patent (No. CN113024865A) discloses a degradable expandable polymer grouting material and its preparation method. The modified bamboo chips are crosslinked with acrylic monomers, polymerized with an initiator to obtain a degradable polymer, and then mixed with a curing agent to obtain a degradable expandable polymer grouting material. In addition to controlling large flow of karst water, this material can degrade on its own over a period of time, reducing environmental pollution. However, this material requires dual component construction with high requirements for construction equipment, and complex construction process.

The published Chinese patent (No. CN1302083C) discloses a production method for water swelling agent. The main technical scheme is to mix anhydrous gypsum, bentonite, and super absorbent polymer with attapulgite soil, and use a skeleton composed of clay and anhydrous gypsum to support the super absorbent polymer to withstand the impact of water flow, achieving a relatively stable expansion and water blocking effect. Although this method can solve the problem of ordinary expansion and plugging bags being flushed away, this technical scheme does not have the function of effectively controlling the start of water swelling of the absorbent material.

The published Chinese patent (No. CN114409967A) discloses preparation and application method of an absorbent material. The main technical scheme is to mix super absorbent polymer, plant fibers, and inorganic fillers to form an absorbent material. The absorbent material is then mixed with ordinary sand, stones, and soil to prepare a plugging material for dam seepage prevention and plugging. This technology can effectively seal leaking embankments through the gravitational covering of sand and stone and the swelling of absorbent materials. However, the onset time of water swelling is uncontrollable and this method does not have a sustained-release function.

In addition, although the existing cement-based grouting materials are cheap and easy to prepare, due to the slow setting time and poor anti erosion of ordinary cement, the application of cement-based grouting materials is not satisfactory, and the water blocking effect is not ideal, especially for dynamic water plugging. Ordinary composite polymer grouting materials can ensure the volume stability of hardened slurry, but they are prone to aging, have high priced raw material, complex material preparation processes, and most organic materials can cause environmental pollution, which limits their application.

DETAILED DESCRIPTION OF THE INVENTION

In order to overcome the shortcomings in the existing technologies mentioned above, the present invention proposes a sustained-release grouting material and its preparation method. The present invention is to wrapping a water-soluble and sustained-release coating outside the composite water swelling core. The sustained-release coating can completely dissolve in water, and swelling time of the grouting water material can be controlled by adjusting the thickness of the sustained-release coating. The preparation process of the present invention is simple, which can effectively solve the technical problems of poor anti erosion and difficult to control the effective time of grouting materials in underground engineering, as well as environmentally friendly.

To achieve the above objectives, the present invention adopts the following technical scheme:

A sustained-release grouting material, characterized in that it is composed of a water swelling core and water-soluble sustained-release coating. The water swelling core is mixture of bentonite, super absorbent polymer, and xanthan, forming by pelletizing with pan granulator based on the cohesiveness of xanthan. The water-soluble sustained-release coating is prepared by mixing water soluble starch, polyvinyl alcohol, poloxamer, lubricants and plasticizers with deionized water to form a film forming solution, which is coated on the swelling core using a coating machine and then dried.

A preparation method for sustained-release grouting material of claim 1, characterized by the following steps:

Step 1: Mixing bentonite, xanthan powder and water evenly to obtain a viscous bentonite wet material;

Step 2: Add high super absorbent polymer (SAP) into the viscous bentonite wet material in step 1 to pelletize and obtain a water swelling core;

Step 3: Air drying the water swelling core prepared in step 2 at room temperature or oven drying below 60° C. to obtain a dry water swelling core;

Step 4: Add deionized water while stirring in the mixture of water soluble starch, polyvinyl alcohol, and poloxamer, and then add water soluble lubricants and plasticizers with stirring until completely dissolved to obtain the film forming solution;

Step 5: Place the dry water swelling core prepared in step 3 in the coating machine, spray the film forming solution prepared in step 4 onto the surface of the rolling water swelling core, inject hot air to evaporate the deionized water in the film forming solution, and form a continuous release coating on the surface of the water swelling core. The coating thickness can be controlled by adjusting the spraying time of the film forming solution, thereby producing grouting materials with different coating thicknesses. The sustained-release and grouting materials can be obtained after cooling.

Preferably, the montmorillonite content in the bentonite in step 1 is more than 80%, xanthan adopts commercially available powder of xanthan; the mass ratio of bentonite to xanthan powder is 10:(0.5~2.5); the water consumption should be suitable for shaping by hand, usually 40%-50% of the mass of bentonite.

Preferably, the mass ratio of bentonite to super absorbent polymer (SAP) in step 2 is 1:(0.5-5), and the particle size of the super absorbent polymer (SAP) ranges from 150 to 180 mesh.

Preferably, the equipment used for pelletizing in step 2 is a pan granulator.

Preferably, the diameter of the water swelling core in step 2 is 1 mm~3 mm.

Preferably, in step 4, the water soluble starch is corn starch, with an amount of 8%~12% by mass of deionized water; the degree of polymerization of polyvinyl alcohol is 1700, the degree of alcoholization is 88%, which can be dissolved in cold water, and the dosage is 3%~5% by mass of deionized water; the dosage of piloxamer is 2%~4% by mass of deionized water; the water soluble lubricant is glycerol, with a dosage of 0.3%~0.5% by mass of deionized water; the plasticizer is one or more of methyl epoxyacetyl linoleate, 2-Oxiraneoctanoic acid, 3-octyl-, 2-ethylhexyl ester and acetyl tributyl citrate, with a dosage of 1%-3% by mass of deionized water.

Preferably, the amount of film forming solution sprayed in step 5 is based on the dry film mass, which is 5%-20% by mass of the water swelling core particles and can be controlled by adjusting the spraying time.

The application method for the present invention is:

The grouting material with appropriate coating thickness is selected according to the specific project, and then the grouting material is mixed with water to form a slurry, which is injected into the permeable part using a grouting equipment. Then the grouting material flows into the cracks and the sustained-release coating dissolves during this process, the swelling core absorbs water and begins to expand. The flow rate gradually decreases until it comes to a standstill, achieving the goal of stopping and blocking water.

The beneficial effects of this invention are:
(1) Bentonite and super absorbent polymer are adopted as the main swelling raw materials, wherein the super absorbent polymer has a high water swelling rate, However, the structure is loose and non-cohesive after absorbing water, making it easy to be flushed away by flowing water. Although the water swelling rate of bentonite is lower than that of super absorbent polymer, it forms a fine slurry that is easy to flow after absorbing water. The fine bentonite slurry can get into the loose-structure expansion body of super absorbent polymer, and the synergistic effect of the two components improves the plugging effect. In addition, the mass ratio of the two components can be adjusted to obtain different swell increment. The water swelling is controllable, the performance of water absorption and release is stable, the porosity of the grouting hardened body is small, and the plugging performance is good.
(2) The xanthan selected in the present invention has a certain gelling effect, which can bind bentonite and super absorbent polymer, making it easy to pelletize. The xanthan also helps to improve the rheological properties of the swelling body after water absorption of super absorbent polymer and bentonite, which is easy for grouting.
(3) A sustained-release coating is wrapped on the surface of the water swelling core using a coating machine in the present invention, and the thickness of coating can be adjusted by controlling the mass ratio of film forming solution to water swelling core, thereby achieving controllable onset time for water swelling core.

DESCRIPNTION OF THE DRAWINGS

To facilitate a better understanding of technical scheme for the present invention, the drawings required in the examples is briefly described below.

FIG. 1 is the preparation flowchart of this invention.

DETAILED DESCRIPTION

The preferred examples of the present invention are described in detail with the drawings as follows. The advantages and characteristics of this invention can be more easily understood by technicians in this field, thereby providing a clearer scope of protection for the present invention.

A sustained-release grouting material and its preparation method, characterized in that it includes sustained-release coating and water swelling core. Water soluble starch and polyvinyl alcohol, etc. are adopted as film forming materials for sustained-release coating, and the water swelling core is a granular high water swelling material prepared by bentonite and super absorbent polymer (SAP). The following examples of certain embodiments are given.

According to FIG. 1, the preparation method of the sustained-release grouting material of the present invention is described as follows.

Example 1

A sustained release grouting material and its preparation method, including the following steps:
Step 1: Mixing bentonite, xanthan powder in a ratio of 10:2, and add xanthan mass of 40% water, then obtain a viscous bentonite wet material;
Step 2: Add high super absorbent polymer (SAP) into the viscous bentonite wet material in step 1 to pelletize and obtain a water swelling core, and the mass ratio of bentonite to SAP is 1:3;
Step 3: Air drying the water swelling core prepared in step 2 at room temperature or oven drying below 60° C. to obtain a dry water swelling core;
Step 4: Based on the quality of deionized water, the following raw materials were weighed according to the mass of deionized water to deionized water: Water-soluble starch 10%, polyvinyl alcohol 4%, poloxamer 3%, glycerol 0.4% and methyl epoxyacetyl linoleate 2%; firstly, water-soluble starch, polyvinyl alcohol and poloxamer were mixed uniformly, and then deionized water, glycerin and methyl epoxidized acetyl linoleate were added. After stirring for 20 min, the completely dissolved film-forming solution was obtained;

Step 5: The dry water swelling core prepared in step 3 is placed in the coating machine, and the film-forming liquid prepared in step 4 is sprayed on the surface of the rolling water swelling core. The amount of film-forming liquid (according to the amount of dry film) is 5% of the mass of the water swelling core, and hot air is introduced to evaporate the deionized water in the film-forming liquid on the surface of the rolling water swelling core, so that the film-forming liquid forms a continuous dry slow-release coating on the surface of the water swelling core. After cooling, the slow-release controllable grouting water plugging material is obtained.

In order to prove the slow-release and expansion properties of the slow-release controllable grouting water plugging material prepared by the invention, a certain volume of the finished product of the slow-release controllable grouting water plugging material prepared by Example 1 is added to a calibrated container with tap water. The time from the addition to the beginning of expansion is recorded. The volume increased by the immobile body in the container after the expansion is the volume of the expansion of the slow-release controllable grouting water plugging material. The expansion ratio of the finished product prepared by Example 1 can be obtained by comparing the volume before and after the expansion of the slow-release controllable grouting water plugging material. The test results are shown in Table 1. The time to start expansion is 9 min, and the expansion ratio is 65 times.

Example 2

Example 2 is the same as Example 1, except that the amount of film forming solution used in Step 5 (calculated based on the dry film amount) is 10% of the mass of the water swelling core. The initial swelling time of the prepared sustained-release grouting material is 38 minutes with 63 times expansion rate.

Example 3

Example 3 is the same as Example 1, except that the amount of film forming solution used in Step 5 (calculated based on the dry film amount) is 20% of the mass of the water swelling core. The initial swelling time of the prepared sustained-release grouting material is 85 minutes with 66 times expansion rate.

Example 4

A sustained release grouting material and its preparation method, including the following steps:

Step 1: Mixing bentonite, xanthan powder in a ratio of 10:1, and add xanthan mass of 40% water, then obtain a viscous bentonite wet material;

Step 2: Add high super absorbent polymer (SAP) into the viscous bentonite wet material in step 1 to pelletize and obtain a water swelling core, and the mass ratio of bentonite to SAP is 1:0.5;

Step 3: Air drying the water swelling core prepared in step 2 at room temperature or oven drying below 60° C. to obtain a dry water swelling core;

Step 4: Based on the quality of deionized water, the following raw materials were weighed according to the mass of deionized water to deionized water: Water-soluble starch 8%, polyvinyl alcohol 3%, poloxamer 2%, glycerol 0.3% and methyl epoxyacetyl linoleate 1%; firstly, water-soluble starch, polyvinyl alcohol and poloxamer were mixed uniformly, and then deionized water, glycerin and methyl epoxidized acetyl linoleate were added. After stirring for 20 min, the completely dissolved film-forming solution was obtained;

Step 5: The dry water swelling core prepared in step 3 is placed in the coating machine, and the film-forming liquid prepared in step 4 is sprayed on the surface of the rolling water swelling core. The amount of film-forming liquid (according to the amount of dry film) is 10% of the mass of the water swelling core, and hot air is introduced to evaporate the deionized water in the film-forming liquid on the surface of the rolling water swelling core, so that the film-forming liquid forms a continuous dry slow-release coating on the surface of the water swelling core. After cooling, the slow-release controllable grouting water plugging material is obtained. After testing, the time to start expansion is 41 min, and the expansion ratio is 9 times.

Example 5

The amount of film-forming solution in implementation example 5 is the same as that in implementation example 4, and the amount of film-forming solution is 10% of the mass of the water-swelling core according to the dry film gauge. Different from the fourth example, the water-soluble starch, PVA, poloxamer, lubricant and plasticizer in the middle coating film-forming solution accounted for 9%, 3%, 3%, 0.4% and 2% of the mass of deionized water, respectively. The mass ratio of bentonite to xanthan gum in the swelling core was 10:1.5, and the mass ratio of bentonite to SAP was 1:2. After testing, the time to start expansion is 45 min, and the expansion ratio is 48 times.

Example 6

The amount of film-forming solution in example 6 is the same as that in example 4, and the amount of film-forming solution is 10% of the mass of the water-swelling core according to the dry film gauge. Different from the fourth example, the water-soluble starch, PVA, poloxamer, lubricant and plasticizer in the middle coating film-forming solution accounted for 12%, 5%, 4%, 0.5% and 3% of the mass of deionized water, respectively. The mass ratio of bentonite to xanthan gum in the swelling core was 10:2, and the mass ratio of bentonite to super absorbent resin was 1:5. After testing, the time to start expansion is 49 min, and the expansion ratio is 156 times.

Table 1 is the raw material ratio of the six examples of the invention and the corresponding test data summary. Bentonite (B) and Xanthan (X) Water soluble starch (WSS)

TABLE 1

| | Swelling core | | Film forming solution | | | | | Expanded core:coating | Test result | |
|---|---|---|---|---|---|---|---|---|---|---|
| | | | | | | | | | the time to start expansion | the expansion ratio |
| No. | B:X | B:SAP | WSS | PVA | Poloxamer | Lubricant | Plasticizer | dry film | (min) | (times) |
| E.g. 1 | 10:2 | 1:3 | 10 | 4 | 3 | 0.4 | 2 | 100:5 | 9 | 65 |
| E.g. 2 | 10:2 | 1:3 | 10 | 4 | 3 | 0.4 | 2 | 100:10 | 38 | 63 |
| E.g. 3 | 10:2 | 1:3 | 10 | 4 | 3 | 0.4 | 2 | 100:20 | 85 | 66 |
| E.g. 4 | 10:1 | 1:0.5 | 8 | 3 | 2 | 0.3 | 1 | 100:10 | 41 | 9 |
| E.g. 5 | 10:1.5 | 1:2 | 9 | 3 | 3 | 0.4 | 2 | 100:10 | 45 | 48 |
| E.g. 6 | 10:2 | 1:5 | 12 | 5 | 4 | 0.5 | 3 | 100:10 | 49 | 156 |

Comparing the test data of the first to the third examples, it can be seen that the thickness of the dry film of the sustained release coating is the key factor affecting the sustained release of the grouting material.

Comparing the examples 4 to 6, it can be seen that changing the ratio of SAP has a great influence on the expansion ratio of the material Comparing the examples 2 and the examples 4 to 6, it is found that even for the film-forming solution of the same thickness, the time when the material begins to expand is slightly different under the condition that the distribution ratio of each group of the film-forming solution changes, which indicates that it is necessary to control the ratio of each component of the film-forming solution The above examples are only the specific implementation methods of the invention, and cannot be used as a limitation to the invention. For example, the six examples all selected methyl epoxyacetyl linoleate as a plasticizer, which is only to facilitate the comparison of test data. It does not mean that methyl epoxyacetyl linoleate is the only available plasticizer. Therefore, the scope of protection should be based on the scope of the claim.

What is claimed is:

1. A method for preparing sustained-release grouting materials comprising the following steps:
   step 1: mixing bentonite, xanthan powder and water to obtain a bentonite wet material;
   step 2: adding a high super absorbent polymer (SAP) into the bentonite wet material to pelletize and obtain wet water swelling core particles;
   step 3: air drying the wet water swelling core particles at room temperature or oven drying below 60° C. to obtain dry water swelling core particles;
   step 4: adding and stirring deionized water in a mixture of water soluble starch, polyvinyl alcohol, and poloxamer, and then adding water soluble lubricants and plasticizers with stirring until completely dissolved to obtain a film forming solution; and
   step 5: placing the dry water swelling core particles in a coating machine, spraying the film forming solution onto the surface of the rolling dry water swelling core particles, inject hot air to evaporate the deionized water in the film forming solution, and forming a continuous release coating on the surface of the dry water swelling core particles; the coating thickness is controlled by adjusting the spraying time of the film forming solution, thereby producing grouting materials with different coating thicknesses; obtaining the sustained-release grouting materials after cooling.

2. The method according to claim 1, wherein the montmorillonite content in the bentonite in the step 1 is more than 80%, the xanthan powder is commercially available powder of xanthan; a mass ratio of the bentonite to the xanthan powder is 10:(0.5~2.5); an amount of the water is 40%~50% by mass of the bentonite.

3. The method according to claim 1, wherein a mass ratio of the bentonite to the super absorbent polymer (SAP) in the step 2 is 1:(0.5-5), and the particle size of the super absorbent polymer (SAP) ranges from 150 to 180 mesh.

4. The method according to claim 1, wherein an equipment used for pelletizing in the step 2 is a pan granulator.

5. The method according to claim 1, wherein the diameter of the wet water swelling core particles in the step 2 is 1 mm~3 mm.

6. The method according to claim 1, wherein in the step 4, the water soluble starch is corn starch, with an amount of 8%~12% by mass of deionized water; the degree of polymerization of polyvinyl alcohol is 1700, the degree of alcoholization is 88%, which is dissolved in cold water, and dosage is 3%~5% by mass of deionized water; a dosage of piloxamer is 2%~4% by mass of deionized water; the water soluble lubricant is glycerol, with a dosage of 0.3%~0.5% by mass of deionized water; the plasticizer is one or more selected form the group consisting of methyl epoxyacetyl linoleate, 2-Oxiraneoctanoic acid, 3-octyl-, 2-ethylhexyl ester and Acetyl tributyl citrate, with a dosage of 1%-3% by mass of deionized water.

7. The method according to claim 1, wherein an amount of the film forming solution sprayed in the step 5 is based on a dry film mass, which is 5%-20% by mass of the rolling dry water swelling core particles and is controlled by adjusting the spraying time.

* * * * *